Patented Dec. 13, 1938

2,139,992

UNITED STATES PATENT OFFICE 2,139,992

VULCANIZING ADHESIVE COMPOSITION

Herbert A. Winkelmann and Eugene W. Moffett, Chicago, Ill., assignors to Marbon Corporation, Chicago, Ill., a corporation of Delaware No Drawing. Application January 18, 1937, Serial No. 121,176

5 Claims. (Cl. 134—17)

This application is a continuation in part of application Ser. No. 55,684 filed Dec. 21, 1935 and relates to compositions particularly adapted for adhering together composite products such as rubber and metal. More especially it relates to liquid coating compositions capable of vulcanization to a relatively non-thermoplastic adhesive product on drying and heating.

Heretofore, various methods of obtaining a permanent adhesion of rubber to metal have been proposed. Generally these methods have been based on the use of an intermediate bonding material between the rubber and metal. However, none of these bonding materials have been entirely satisfactory. Some of the bonding materials give mediocre adhesion, others give satisfactory adhesion at room temperature but fail at elevated temperatures, and many of the bonding materials are expensive or not readily available.

It is, therefore, an object of this invention to produce a composite product in which rubber and metals are firmly united, and to provide an inexpensive and readily performed process for manufacturing the product. Other objects will become apparent from the following description of the invention.

The invention comprises broadly the adhering of rubber or other resilient rubber like substances to a material such as metal by interposing between the rubber or like substance and the metal a bonding material including a halogen containing rubber derivative.

The composition of the bonding material may vary widely from the straight unmodified halogen containing rubber derivative, preferably a rubber hydrohalide, to a composition in which the halogen containing rubber derivative is in a large, although not predominant proportion. The rubber hydrohalides may be crystalline, amorphous, soluble type or insoluble type, saturated, partially saturated or partially thermally decomposed. Likewise, the rubber halides may be saturated or partially saturated.

An adhesion of rubber to metal which is superior to that obtained by vulcanizing rubber in direct contact with metal is obtained by applying straight unmodified rubber hydrochloride in solution or solid form to the metal, superimposing a layer of vulcanizable rubber containing sulfur and accelerator over the rubber hydrochloride, and subjecting the composite product to heat and pressure sufficient to vulcanize the rubber.

A better adhesion of rubber to metal, however, is obtained by the use of the following compositions:

TABLE

Exemplary preferred composition

| | Best | Variations |
|---|---|---|
| Rubber hydrochloride: | | |
| (30% chlorine content) | 100 | 100 |
| Vulcanizing agent: | | |
| Sulfur | 50 | 20-80 |
| Accelerator: | | |
| Butyraldehyde-aniline | 3 | 2-10 |
| Plasticizer: | | |
| Dibutyl phthalate | 75 | 25-100 |
| Heat stabilizer: | | |
| Magnesium oxide (MgO) | 10 | 0-20 |
| Lead oxide (PbO) | 10 | 0-20 |

It should be understood, however, that the above formulae are but illustrations of preferred embodiments of this invention.

Hard or soft rubber may be used. Pure gum stock and unmodified reclaim give good results but many stocks have oils and fillers which are apt to lessen the adhesion so that care must be taken in their choice, and the proportions of modifiers in the rubber hydrochloride must be varied according to the type of plasticizers and fillers in the rubber stock. In general, any vulcanizable rubber or rubber like material can be used. It is also possible to use a pre-vulcanized rubber. Tread stocks and the like may be improved in ability to adhere to metal by compounding with reclaim.

Other vulcanizing agents than sulfur may be used. The use of sulfur chloride applied to the rubber hydrochloride immediately before assembling the rubber and metal together results in a cold vulcanization of the rubber hydrohalide, and to some extent of the adjoining rubber.

Other accelerators for the vulcanization of rubber hydrochloride than butyraldehyde-aniline may be used. Piperidinium penta-methylene dithio-carbamate gives good results. The use of an accelerator is not absolutely essential.

The choice of a proper plasticizer is important. The plasticizer, however, is not essential even in the preferred composition, but many plasticizers greatly improve the adhesiveness of the rubber hydrohalide to the metal and to the rubber. However, there are some materials which are splendid softeners or plasticizers for rubber hydrohalide which give negative results or are actually detrimental to adhesion, particularly to the adhesion of the rubber hydrohalide to the rubber. Dibutyl phthalate has an effect on the rubber as well as on the rubber hydrochloride, which results in a superior bond of the rubber hydrochloride to the rubber. Other materials which may be used satisfactorily in place of dibutyl phthalate, although not with such good results are butyl stearate, butyl oleate, butyl ricinoleate, ester gum, maleic anhydride and drying oils.

The use of heat stabilizers such as magesium oxide, magnesium carbonate and lead oxide is useful in the heat treatment and in the mixing of the ingredients when the mixture is made by milling.

Milling of the sulfur and other solids into the rubber hydrochloride results in a better dispersion and appears to give a composition of better bonding power. Furthermore, the milled mixture dissolves more readily in benzol or other solvents, forming a cement which is less viscous than the unmilled products. A cement or liquid coating composition comprising an intimate dispersion of the materials of the table in benzol or like volatile solvent to form an approximately 20% solution is particularly adaptable for coating metal.

The article which is to be coated with rubber, for example a steel plate, is cleaned free of grease and scale, as for example by sand blasting. The article is then given a uniform coat of the cement described above. The coating may then be dried to obtain a film. However, as an alternative method a preformed sheet of the rubber hydrochloride composition without solvents may be superimposed on the metal. Such a preformed sheet may be obtained by milling and calendering the composition into a sheet. A layer of vulcanizable rubber is then applied over the rubber hydrohalide and metal, and the composite structure is vulcanized under pressure in a heated mold or in a vulcanizer containing steam or hot water under pressure. The temperature and time of cure may vary within wide limits, and is necessarily more for some types of stock than others. A temperature of 290° F. and a time of twenty minutes has been found satisfactory for the compositions of the table using a pure gum stock. At this temperature and time, for example, the rubber and rubber hydrohalide both become cured or vulcanized, and both become relatively non-thermoplastic. The vulcanization of the rubber hydrohalide improves its adhesive properties, particularly at elevated temperatures. Thus it becomes possible to remove the composite vulcanized product from a hot mold with consequent saving of time and expense. The vulcanized rubber hydrochloride bond is also more resistant to solvents, lubricating oils and the like than an unvulcanized rubber hydrochloride.

Rubber adhered to metal by the process described above can be bonded to the metal so that it cannot be torn loose, the strength of the adhesive bond exceeding the strength of the rubber. The proportions in the formulae given above, however, in many cases must be modified to obtain this result with all types of rubber stock. With a reclaim substantially free of oily material and bonded with the above described best preferred formula of the table a pull of thirty pounds applied to a 1" wide strip of the bonded rubber resulted in the rubber tearing or splitting, while the rubber hydrochloride composition remained firmly adhering to the metal and to the adjoining rubber. Pure gum stock gives similar results. However, the best results are obtained with a reclaim or a rubber of low plasticity.

Although the invention has been described as carried out with an unvulcanized rubber it may be carried out with advantages with prevulcanized rubber. A composite product of metal, rubber hydrohalide containing sulfur and accelerator, and vulcanized rubber can be bonded together by vulcanization in a shorter time than required for the curing of composite product comprising unvulcanized rubber. The composite structure may be bonded together by pressure. It is advisable, however, to subject the structure to heat sufficient to at least thermoplasticize the rubber hydrohalide, and preferably sufficient to cure or vulcanize the rubber hydrohalide.

In the case of some rubber stocks, as for example a tread stock containing large percentages of carbon black, it is advisable to use a partition coating. The rubber hydrohalide composition is coated on the metal. Then a partition coating composed of, for example, 100 parts by weight of tread stock, 200 parts by weight of reclaim is coated over the rubber hydrohalide. The tread stock is then superimposed on the partition coating, and the entire assembly subjected to heat and pressure sufficient to cure the rubber and rubber hydrochloride. Some stocks such as high carbon containing tread stocks and certain reclaim appear to adhere better to the partition coating than to the rubber hydrochloride composition. The rubber hydrochloride compositions, on the other hand, seem to adhere better to the metal than the partition coating will adhere to the metal, and also forms a strong bond with the partition coating.

The use of rubber hydrobromide in place of rubber hydrochloride is within the bounds of this invention. Halogenated rubber hydrohalides and rubber halides may be used to some extent but in many important respects they act entirely differently than the hydrohalides, as for example, in their instability, particularly under the influence of heat. It has been found that the rubber hydrohalides have such properties that they of themselves and in conjunction with other materials give a superior rubber to metal bond.

However, the rubber halides as operable and the rubber halide compositions containing sulfur act similarly to the rubber hydrohalide compositions. Rubber chloride, for example, may be substituted for rubber hydrochloride in the formulae of the table, the composition interposed between rubber and metal and the assembly subjected to heat and pressure to cure as with the curing of the rubber hydrohalide compositions. It is believed that the rubber chloride containing sulfur and accelerator is also vulcanized although the action is apparently slower than with rubber hydrohalides. Whatever the action, the addition of sulfur to the rubber chloride improves the strength of the metal to rubber bond.

Although the invention has been described above with relation to the use of steel and rubber, it is not intended to so limit it except as necessitated by the prior art. The process is operable to unite rubber and rubber like materials such as polymerized chloroprene, polymethylene-polysulphide plastics to other materials generally, including iron and steel, copper, brass, aluminum, porcelain, glass, wood, paper, etc.

While there has been disclosed with considerable detail certain preferred manners of performing this invention, it is not intended or desired to be solely limited thereto, for as hitherto

We claim:

1. A liquid composition suitable for coating and like purposes, comprising a solution of a rubber hydrohalide containing sulfur in intimate admixture therewith the sulphur being present in approximately 20 to 80 parts by weight per 100 parts by weight of rubber hydrohalide.

2. A liquid composition suitable for coating and like purposes, comprising a solution of a rubber hydrochloride containing in intimate admixture therewith sulfur, a low temperature vulcanizing accelerator, and a plasticizer for said rubber hydrochloride the sulphur being present in approximately 20 to 80 parts by weight per 100 parts by weight of rubber hydrohalide.

3. A liquid composition suitable for coating and like purposes comprising a solution of a rubber hydrochloride containing in intimate admixture therewith sulfur, an accelerator, a plasticizer and a basic stabilizer for said rubber hydrochloride the sulphur being present in approximately 20 to 80 parts by weight per 100 parts by weight of rubber hydrohalide.

4. An adhesive having approximately the following composition:

| | Parts by weight |
|---|---|
| Rubber hydrochloride | 100 |
| Sulphur | 20–80 |
| Accelerator | 2–10 |
| Plasticizer | 25–100 |

5. An adhesive having approximately the following composition:

| | Parts by weight |
|---|---|
| Amorphous rubber hydrochloride | 100 |
| Sulphur | 50 |
| Butyraldehyde-aniline | 3 |
| Dibutyl phthalate | 75 |
| Magnesium oxide | 10 |
| Lead oxide | 10 |

HERBERT A. WINKELMANN.
EUGENE W. MOFFETT.